United States Patent
Chen et al.

(10) Patent No.: US 10,578,507 B2
(45) Date of Patent: Mar. 3, 2020

(54) PRESSURE MEASURING METHOD AND PRESSURE MEASURING APPARATUS

(71) Applicant: PixArt Imaging Inc., Hsin-Chu (TW)

(72) Inventors: Yu-Han Chen, Hsin-Chu (TW); Chih-Wei Huang, Hsin-Chu (TW); Chi-Chieh Liao, Hsin-Chu (TW); Wei-Chung Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 227 days.

(21) Appl. No.: 15/482,815

(22) Filed: Apr. 9, 2017

(65) Prior Publication Data
US 2017/0292888 A1    Oct. 12, 2017

(30) Foreign Application Priority Data

Apr. 12, 2016   (TW) .............................. 105111402 A
Mar. 24, 2017   (CN) .......................... 2017 1 0185891

(51) Int. Cl.
| | | |
|---|---|---|
| G01L 9/12 | (2006.01) | |
| G01L 25/00 | (2006.01) | |
| G01L 1/14 | (2006.01) | |
| G06F 3/041 | (2006.01) | |
| G06F 3/044 | (2006.01) | |

(52) U.S. Cl.
CPC .............. *G01L 25/00* (2013.01); *G01L 1/142* (2013.01); *G06F 3/044* (2013.01); *G06F 3/0418* (2013.01)

(58) Field of Classification Search
None
See application file for complete search history.

(56) References Cited

U.S. PATENT DOCUMENTS

| | | | | |
|---|---|---|---|---|
| 2008/0162996 A1* | 7/2008 | Krah | ..................... | G06F 1/3203 714/27 |
| 2012/0280946 A1* | 11/2012 | Shih | ..................... | G06F 3/0418 345/178 |

FOREIGN PATENT DOCUMENTS

CN           102980715 A        3/2013

OTHER PUBLICATIONS

Practical design of microcomputer non-electricity measuring instrument, De Yu Chang, p. 90-94, Beijing: Water Power Press, Jun. 30, 1990.

* cited by examiner

*Primary Examiner* — Paul M. West
*Assistant Examiner* — Mark A Shabman
(74) *Attorney, Agent, or Firm* — Winston Hsu

(57) ABSTRACT

A pressure measuring method, applied to a pressure measuring apparatus, comprising: measuring a first pressure sensing value of the pressure measuring apparatus, which corresponds to a first pressure in a test mode; measuring a second pressure sensing value of the pressure measuring apparatus, which corresponds to a second pressure in the test mode; generating a first corresponding function according to the first pressure, the second pressure, the first pressure sensing value and the second pressure sensing value; sensing a third pressure sensing value via the pressure measuring apparatus in a normal mode; and generating a third pressure according to the third pressure sensing value via the first corresponding function; wherein the pressure measuring apparatus operates at a first scan frequency. By this way, the pressure sensing value can be calibrated, to solve the issue that the pressure sensing values are affected by scan frequencies.

5 Claims, 6 Drawing Sheets

PRESSURE MEASURING METHOD AND PRESSURE MEASURING APPARATUS

CROSS REFERENCE TO RELATED APPLICATION

This application claims the benefit of TWN Application No. 105111402, filed on Apr. 12, 2016, the contents of which are incorporated herein by reference.

BACKGROUND OF THE INVENTION

1. Field of the Invention

The present invention relates to a pressure measuring method and a pressure measuring apparatus, and particularly relates to a pressure measuring method and a pressure measuring apparatus which can calibrate pressure measuring errors due to different scan frequencies.

2. Description of the Prior Art

For sensing a press action for the user, the electronic apparatus always has a pressure measuring apparatus provided under a control interface (ex. a touch screen or a touch panel) of the electronic apparatus. By this way, the pressure measuring apparatus can determine if the user performs a press action.

The electronic apparatus can apply such kind of press actions to other control methods rather than provides a function only according to the press action. For example, a modern electronic apparatus always can be controlled according to a gesture. However, such gesture is only limited to a 2 dimensional gesture, for example, scale a picture or unlock the electronic apparatus via a finger swipe. However, the 2 dimensional gesture cannot meet the requirement for the user, since the electronic apparatus contains more and more functions. Accordingly, a 3 dimensional gesture is needed, which may comprise a press action.

However, the scan frequencies that the electronic apparatus scans the pressure measuring apparatus needs to be adjusted corresponding to different noise conditions. By this way, a better SNR (Signal to Noise Ratio) can be acquired. The SNR affects the pressure sensing value generated by the pressure measuring apparatus, such that the pressure sensing value may have error. Accordingly, the pressure measuring result becomes non-accurate.

SUMMARY OF THE INVENTION

Therefore, on objective of the present invention is to provide a capacitive pressure measuring method which can calibrate pressure measuring errors.

Another objective of the present invention is to provide a capacitive pressure measuring apparatus which can calibrate pressure measuring errors.

One embodiment of the present invention discloses: A pressure measuring method, applied to a pressure measuring apparatus, comprising: measuring a first pressure sensing value of the pressure measuring apparatus, which corresponds to a first pressure in a test mode; measuring a second pressure sensing value of the pressure measuring apparatus, which corresponds to a second pressure in the test mode; generating a first corresponding function according to the first pressure, the second pressure, the first pressure sensing value and the second pressure sensing value; sensing a third pressure sensing value via the pressure measuring apparatus in a normal mode; and generating a third pressure according to the third pressure sensing value via the first corresponding function; wherein the pressure measuring apparatus operates at a first scan frequency.

Another embodiment of the present invention discloses a pressure measuring apparatus, comprising: a pressure sensing module, operating at a first frequency; and a calibrating module, recording a first corresponding function; wherein the pressure sensing module senses a third pressure sensing value in a normal mode, and the calibrating module generates a third pressure according to the third pressure sensing value via the first corresponding function; wherein the first corresponding function is generated via following steps: the pressure sensing module measures a first pressure sensing value of the pressure measuring apparatus, which corresponds to a first pressure, in a test mode; the pressure sensing module measures a second pressure sensing value of the pressure measuring apparatus, which corresponds to a second pressure in the test mode; the calibrating module generates a first corresponding function according to the first pressure, the second pressure, the first pressure sensing value and the second pressure sensing value.

Still another embodiment of the present invention discloses: a pressure measuring method, applied to a pressure measuring apparatus, comprising: measuring a first actual pressure sensing value while the pressure measuring apparatus operates at a first scan frequency in a test mode, and measuring a pressure sensing value while the pressure measuring apparatus operates at the first scan frequency and a pressure is 0, to compute a first calibrating value; applying the first calibrating value to calibrate the first actual pressure sensing value to generate a first calibrated pressure sensing value in a normal mode while the pressure measuring apparatus operates at the first scan frequency; and generating a first calibrating pressure according to the first calibrated pressure sensing value.

Still another embodiment of the present invention discloses: a pressure measuring apparatus, comprising: a pressure sensing module, configured to measure a first actual pressure sensing value while the pressure measuring apparatus operates at a first scan frequency in a test mode; a calibrating value generating module, configured to measure a pressure sensing value while the pressure measuring apparatus operates at the first scan frequency and a pressure is 0, to compute a first calibrating value; and a calibrating module, configured to apply the first calibrating value to calibrate the first actual pressure sensing value to generate a first calibrated pressure sensing value in a normal mode while the pressure measuring apparatus operates at the first scan frequency, and to generate a first calibrating pressure according to the first calibrated pressure sensing value.

Still another embodiment of the present invention discloses: A pressure measuring method, applied to a pressure measuring apparatus, comprising: measuring a first pressure sensing value of the pressure measuring apparatus, which corresponds to a first pressure in a test mode, and measuring a second pressure sensing value of the pressure measuring apparatus, which corresponds to a second pressure in the test mode, while the pressure measuring apparatus operates at a first scan frequency; generating a first corresponding function according to the first pressure, the second pressure, the first pressure sensing value and the second pressure sensing value; measuring a fourth pressure sensing value of the pressure measuring apparatus, which corresponds to a fourth pressure in the test mode, and measuring a fifth pressure sensing value of the pressure measuring apparatus, which corresponds to a fifth pressure in the test mode, while the pressure measuring apparatus operates at a second scan frequency; generating a second corresponding function according to the fourth pressure, the fifth pressure, the fourth pressure sensing value and the fifth pressure sensing value; wherein the pressure measuring apparatus operates at a third scan frequency in a normal mode, where the pressure measuring apparatus generates a corresponding pressure sensing value according to the first corresponding function if a difference between the first scan frequency and the third scan frequency is smaller than a difference between the second scan frequency and the third scan frequency, wherein the pressure measuring apparatus generates the corresponding pressure sensing value according to the second corresponding function if a difference between the second scan frequency and the third scan frequency is smaller than a difference between the first scan frequency and the third scan frequency.

Still another embodiment of the present invention discloses: a pressure measuring apparatus, comprising: a pressure sensing module, respectively operating at a first scan frequency and a second frequency in a test mode, and operating at a third frequency in a normal mode; a calibrating module, configured to record a first corresponding function and a second corresponding function; wherein the pressure measuring apparatus generates a corresponding pressure sensing value according to the first corresponding function if a difference between the first scan frequency and the third scan frequency is smaller than a difference between the second scan frequency and the third scan frequency; wherein the pressure measuring apparatus generates the corresponding pressure sensing value according to the second corresponding function if a difference between the second scan frequency and the third scan frequency is smaller than a difference between the first scan frequency and the third scan frequency.

Still another embodiment of the present invention discloses a pressure measuring method applied to a pressure measuring apparatus. The pressure measuring method comprises: acquiring a detected pressure sensing value from a pressure measuring apparatus, wherein the pressure measuring apparatus operates at a working scan frequency; comparing the working scan frequency with a first scan frequency and a second scan frequency; applying the detected pressure sensing value to a first corresponding function to generate a working pressure when the working scan frequency is closer to the first frequency than to the second frequency; and applying the detected pressure sensing value to a second corresponding function to generate the working pressure when the working scan frequency is closer to the second frequency than to the first frequency.

In view of above embodiments, the pressure sensing value can be calibrated, to solve the issue that the pressure sensing values are affected by scan frequencies for prior art.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided to explain the concept of the present invention. Please note, the following components such as apparatuses, modules or units can be implemented by hardware (ex. a circuit) or hardware with software (ex. program installed to a processing unit). Besides, different components can be integrated to a single component, and a single component can be separated into a plurality of components. Such variations should also fall in the scope of the present invention. Additionally, a capacitive pressure measuring apparatus is taken as an example for explaining, but the present invention can be applied to other types of pressure measuring apparatuses. Furthermore, the pressure measuring apparatus and the pressure measuring method are not limited to a control interface of an electronic apparatus illustrated in prior art.

The present application relates to a capacitive pressure measuring apparatus, which comprises at least one capacitive device. The capacitive device generates different capacitance values representing equivalent capacitance values of different cell of the capacitive pressure measuring apparatus indicating pressures in different locations. For example, if the pressure value is 0, which means the user does not press the apparatus or no external pressure is applied to the capacitive pressure measuring apparatus, the equivalent capacitance value is 5 pF. In another example, if the pressure value is 100 g/cm$^2$, which means the user performs a press action, the equivalent capacitance value is 10 pF.

Ideally, if the pressure value is the same, the capacitive devices of the capacitive pressure measuring apparatus should have a fixed equivalent capacitance value. However, practically such equivalent capacitance value is affected by various factors, thus the equivalent capacitance values may be different even if the pressure value is the same. For example, the capacitive pressure measuring apparatus samples the capacitance values via a frequency of a scan signal, i.e. scan frequency. However, the capacitive devices of the capacitive pressure measuring apparatus have different responses for different scan frequencies, thus the scan frequency may affect the equivalent capacitance value of the capacitive device. Also, the scan frequency must be adjusted corresponding to different noise situations, to have a better SNR. Accordingly, the measuring of the equivalent capacitance value is easily affected by scan frequency variations, thereby interference for determination of the pressure is caused.

Figure 1:
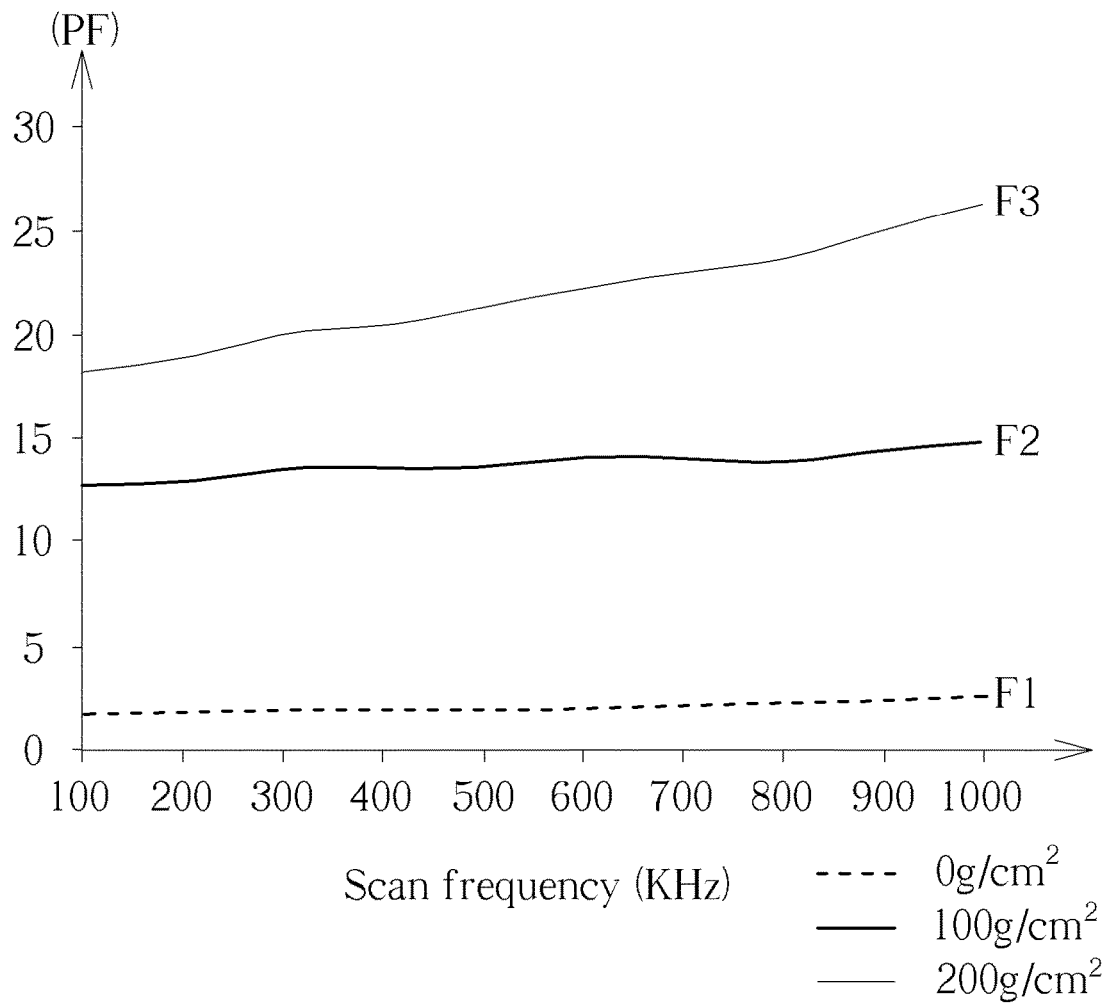
FIG. 1 is a schematic diagram illustrating that a pressure measuring apparatus has error for sensing the pressure due to different scan frequencies.

FIG. 1 is a schematic diagram illustrating that a pressure measuring apparatus has error for sensing the pressure due to different scan frequencies. As illustrated in FIG. 1, the frequency/capacitance relation lines F1, F2, F3 indicate relations between the equivalent capacitance values and scan frequencies for different pressure values. Ideally, the equivalent capacitance values are different fixed values for different pressure values, thus the frequency/capacitance relation lines F1, F2, F3 should be horizontal lines. However, practically the scan frequency of the capacitive pressure measuring apparatus affect the equivalent capacitance values, thus the equivalent capacitance values change due to the scan frequencies even if the pressure value is the same. In such case, the pressure measuring apparatus may incorrectly determine the press action.

Figure 2:
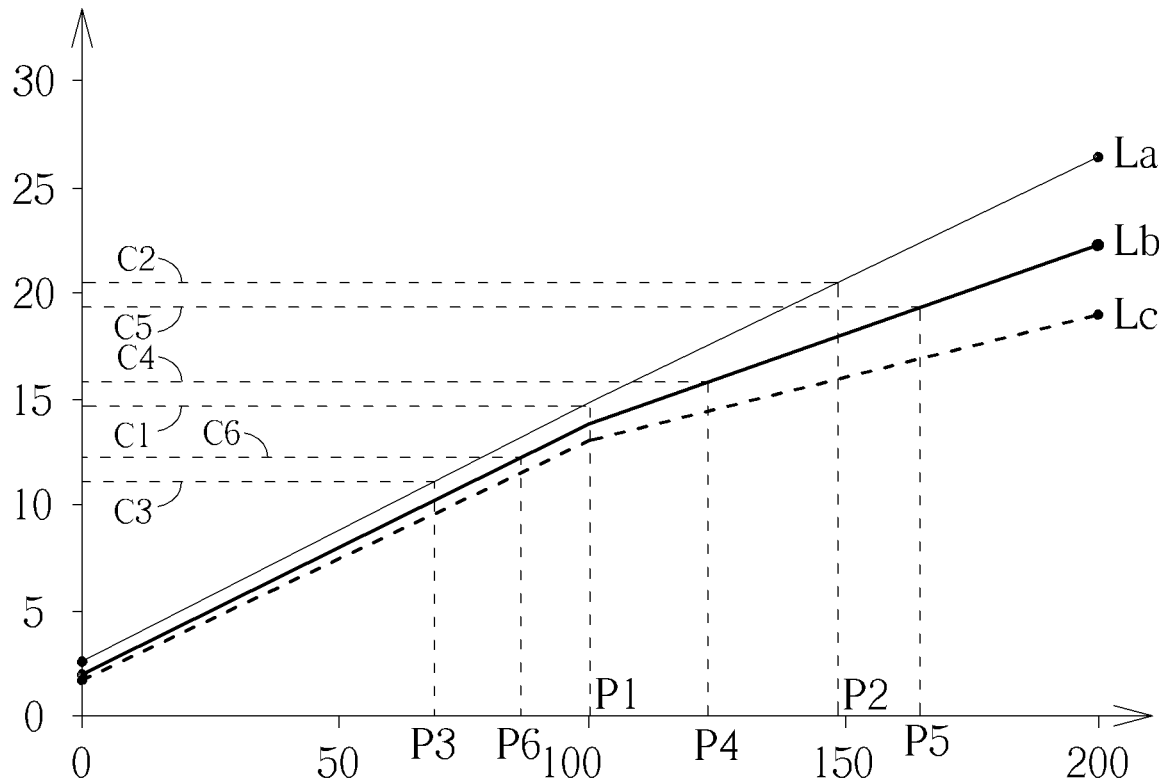
FIG. 2 is a schematic diagram illustrating computing pressures based on corresponding functions generated by a plurality of pressure-sensing value relations, according to one embodiment of the present invention.

FIG. 2 is a schematic diagram illustrating computing pressures based on corresponding functions generated by a plurality of pressure-sensing value relations, according to one embodiment of the present invention. The pressure/sensing value relation lines LA, Lb, and Lc in FIG. 2 respectively indicate relations for pressures and pressure sensing values for different scan frequencies. As illustrated in FIG. 2, the pressure measuring method provided by the present invention measures a first pressure sensing value C1 of the pressure measuring apparatus in a test mode, which corresponds to a first pressure P1, and measures a second pressure sensing value C2 of the pressure measuring apparatus in the test mode, which corresponds to a second pressure P2. If the pressure measuring apparatus is a capacitive pressure measuring apparatus, the first pressure sensing value C1 and the second pressure sensing value C2 are equivalent capacitance values detected under different pressure. Take the pressure/sensing value relation line La for example, the first pressure sensing value C1 is 14 pF while the first pressure P1 is 100 g/cm2, and the second pressure sensing value C2 is 21 pF while the second pressure P2 is 150 g/cm2. Therefore, the pressure/sensing value relation line La (i.e. operating at the first scan frequency) can be acquired based on the first pressure P1, the second pressure P2, the first pressure sensing value C1 and the second pressure sensing value C2. That is, a first corresponding function for the pressure measuring apparatus operating at 1000 Khz scan frequency is acquired. In one embodiment, the first corresponding function is C=aP+b, wherein a is a slop based on C1−C2 divided by P1−P2, and b is an equivalent capacitance value while the pressure is 0.

After acquiring the first corresponding function, the first corresponding function is recorded in the pressure measuring apparatus or recorded in a storage apparatus outside the pressure measuring apparatus. After that, the first corresponding function is applied to compute a corresponding pressure according to a pressure sensing value sensed by the pressure measuring apparatus while the pressure measuring apparatus operates at the first scan frequency. That is, the pressure measuring apparatus senses a third pressure sensing value in a normal mode, and generates a third pressure according to the third pressure sensing value via the first corresponding function. Take FIG. 2 for example, the pressure measuring apparatus applies the first corresponding function to compute pressures while operating at the first scan frequency. In such case, if the sensed pressure sensing value is a third pressure sensing value C3, then a corresponding pressure P3 can be computed according to the first corresponding function.

In one embodiment, the test mode indicates a state that a manufacturer completes the producing of the pressure measuring apparatus and adjusts the pressure measuring apparatus, which also means the user does not use the pressure measuring apparatus yet. On the opposite, the normal mode means a state that the pressure measuring apparatus is already provided to an electronic apparatus, and the user can use it.

Please note, in above-mentioned embodiments, two sample data P1, P2 is applied to compute the first corresponding function, but more sample data can be applied. The corresponding function can be more close to a real pressure/sensing value relation line if a number of the sample data increases.

For more detail, the corresponding function can be established via a lookup table. For example, at a specific scan frequency, sensing values for different pressures are measured. Such sensing values are recorded to a lookup table. In the normal mode, if a pressure sensing value is detected, a corresponding pressure can be acquired via interpolation referring to the look up table. For example, if the pressure sensing value CM falls between C1 and C2, the formula (CM−C1)/(C1−C2) can be applied to compute a corresponding pressure PM. For more detail, the corresponding pressure PM equals PM=P1+(P2−P1)*(CM−C1)/(C1−C2). It will be appreciated that other methods that can acquire corresponding functions should also fall in the scope of the present invention.

In one embodiment, corresponding functions for different scan frequencies are computed since the pressure measuring apparatus has a plurality of scan frequencies. In one embodiment, the pressure measuring method provided by the present invention measures a fourth pressure sensing value C4 of the pressure measuring apparatus, which corresponds to a fourth pressure P4 in a test mode, and measures a fifth pressure sensing value C5 of the pressure measuring apparatus, which corresponds to a fifth pressure P5 in the test mode. The pressure/sensing value relation line Lb can be acquired based on the fourth pressure P4, the fifth pressure P5, the fourth pressure sensing value C4 and the fifth pressure sensing value C5. That is, a second corresponding function for the pressure measuring apparatus operating at 600 Khz scan frequency (i.e. operating at the second scan frequency) is acquired. Take FIG. 2 for example, the second corresponding function is applied to compute the pressure while the pressure measuring apparatus operates at the second scan frequency. In such case, if the sixth pressure sensing value C6 is measured, the corresponding pressure P6 is acquired based on the second corresponding function.

Figure 3:
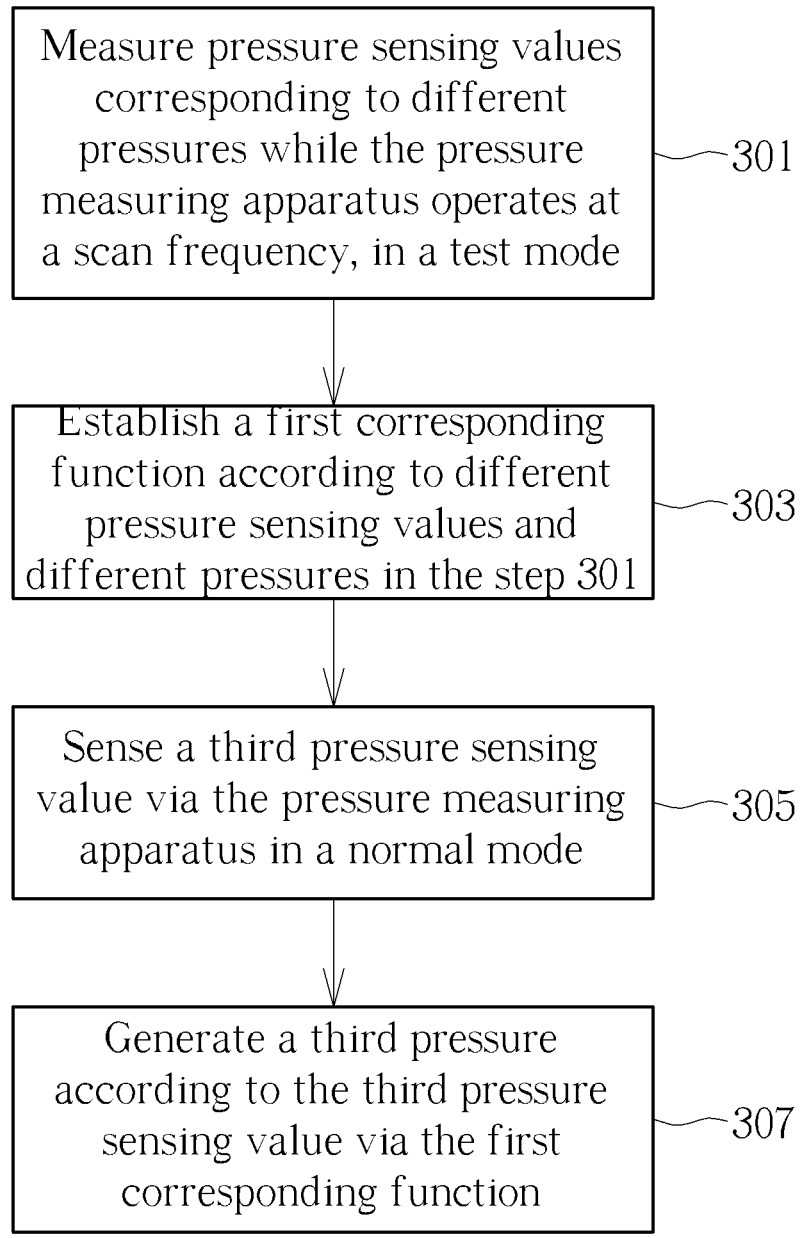
FIG. 3 is a flow chart illustrating a pressure measuring method according to one embodiment of the present invention.

AS above-mentioned, the pressure measuring method provided by the present invention can be applied to other types of pressure measuring apparatuses. Accordingly, a pressure measuring method summarized in FIG. 3 can be acquired:

Step 301

Measure pressure sensing values corresponding to different pressures while the pressure measuring apparatus operates at a scan frequency, in a test mode. For example, as illustrated in FIG. 2, measure a first pressure sensing value C1 corresponding to the first pressure P1, and measure a second pressure sensing value C2 corresponding to the second pressure P2, at a first scan frequency.

Step 303

Establish a first corresponding function according to different pressure sensing values and different pressures in the step 301. As above-mentioned, pressure sensing values corresponding to different pressures while the pressure measuring apparatus operates for different scan frequencies can be measured. Therefore, as illustrated in FIG. 2, a fourth pressure sensing value C4 corresponding to the fourth pressure P4, and a fifth pressure sensing value C5 corresponding to the fifth pressure P5, can be measured at a second scan frequency to generate second corresponding function.
Step 305
Sense a third pressure sensing value via the pressure measuring apparatus in a normal mode.
Step 307
Generate a third pressure according to the third pressure sensing value (ex. C3. P3 in FIG. 2) via the first corresponding function. Please note the third pressure can be named a corresponding function since it is acquired based on the corresponding function.

Other detail steps are disclosed in above-mentioned embodiments, thus are omitted for brevity here.

In one embodiment, the lookup table is recorded to the pressure measuring apparatus, a user can acquire a corresponding pressure based on a sensed pressure sensing value and the current scan frequency via the lookup table, in a normal mode. Also, the number for the pressure/sensing value relation lines may be limited, for example, only 5 pressure/sensing value relation lines for different scan frequencies can be recorded. Accordingly, in one embodiment, if the pressure measuring apparatus operates at a special scan frequency which does not belong to any recorded scan frequency, it is computed that which one of the recorded scan frequencies is closest to the specific scan frequency. Also, a corresponding function for the closest one of the recorded scan frequencies is selected for calibrating.

Take the embodiment in FIG. 2 for example, after the first corresponding function (pressure/sensing value relation line La) and the second corresponding function (pressure/sensing value relation line Lb) are acquired, the corresponding functions are recorded to a pressure measuring apparatus. Also, in the normal mode, the pressure measuring apparatus operates at a third scan frequency, and computes which one of the first scan frequency and the second scan frequency is closer to the third scan frequency to determine which scan frequency should be applied. Also, a corresponding function for the closest one of the recorded scan frequencies is selected for calibrating. For example, if the third scan frequency is 900 KHz, then it is closer to 1000 Khz, thus the first corresponding function is applied to generate a corresponding pressure. On the opposite, if the third scan frequency is 700 KHz, then it is closer to 600 Khz, thus the second corresponding function is applied to generate a corresponding pressure.

In a related embodiment, the third scan frequency is a working scan frequency. In such case, a working pressure can be acquired based on a detected pressure sensing value and a corresponding function for a scan frequency closer to the working scan frequency. For more detail, a pressure measuring method can be acquired, which comprises following steps: acquiring a detected pressure sensing value from a pressure measuring apparatus, wherein the pressure measuring apparatus operates at a working scan frequency; comparing the working scan frequency with a first scan frequency and a second scan frequency; applying the detected pressure sensing value to a first corresponding function to generate a working pressure when the working scan frequency is closer to the first frequency than to the second frequency; and applying the detected pressure sensing value to a second corresponding function to generate the working pressure when the working scan frequency is closer to the second frequency than to the first frequency.

Figure 4:
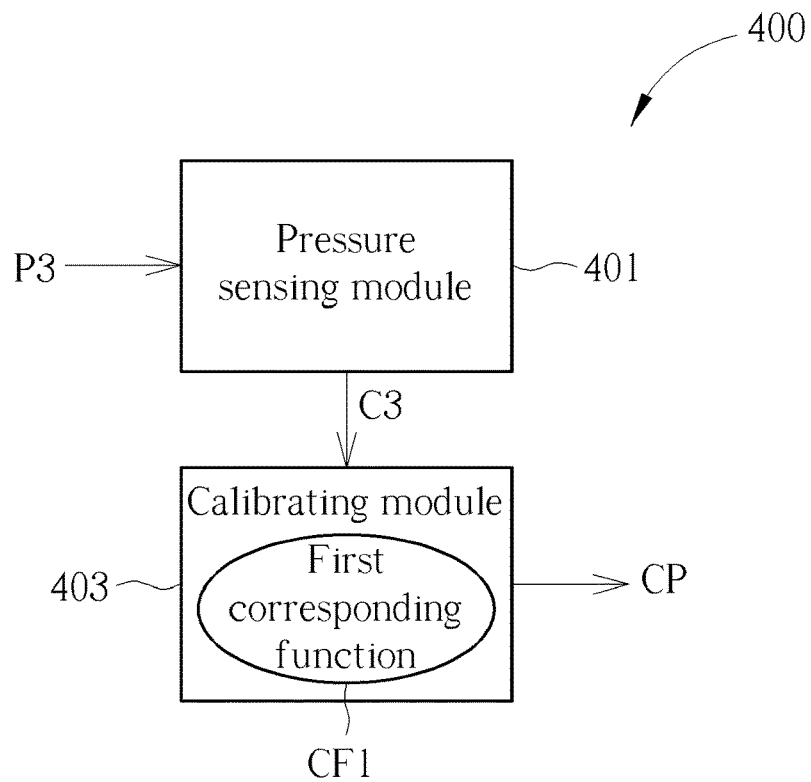
FIG. 4 is a block diagram illustrating a pressure measuring apparatus according to one embodiment of the present invention.

FIG. 4 is a block diagram illustrating a pressure measuring apparatus according to one embodiment of the present invention. As illustrated in FIG. 4, the pressure measuring apparatus 400 comprises a pressure sensing module 401 and a calibrating module 403. The calibrating module 403 records a first corresponding function CF1, which corresponds to a first scan frequency. The first corresponding function CF1 can be generated by the steps 301 and 303 in FIG. 3. That is, the pressure sensing module 401 generates pressure sensing values corresponding to different pressures, for example, the first pressure sensing value C1, the second pressure sensing value C2 in FIG. 2. The calibrating module 403 generates a first corresponding function CF1 according to different pressures and pressure sensing values in the step 301. After that, in a normal mode, the pressure sensing module 401 senses a third pressure sensing value C3. The calibrating module 403 generates a corresponding pressure CP, such as the third pressure in FIG. 2, according to the third pressure sensing value C3 via the first corresponding function CF1.

As above-mentioned descriptions, the calibrating module 403 can record a plurality of corresponding functions for a plurality of scan frequencies. Each one of the corresponding functions corresponds to one scan frequency. Accordingly, if the pressure sensing module 401 senses the third pressure sensing value C3, the pressure sensing module 401 can apply the current scan frequency to select the corresponding function, to generate the third pressure P3.

Other detail descriptions are disclosed in above-mentioned embodiments, thus are omitted for brevity here.

In view of above-mentioned embodiments, the pressure sensing values can be properly calibrated, thus the issue that the pressure sensing values are affected by different scan frequencies can be avoided. Additionally, other parameters which are for the pressure measuring apparatus and are easily affected by different scan frequencies can be compensated by above-mentioned corresponding functions as well.

In above-mentioned embodiments, a corresponding function is generated to transform pressure sensing values generated by the pressure sensing module to new corresponding pressure sensing values. However, other methods can also be applied to calibrate pressure sensing values.

Figure 5:
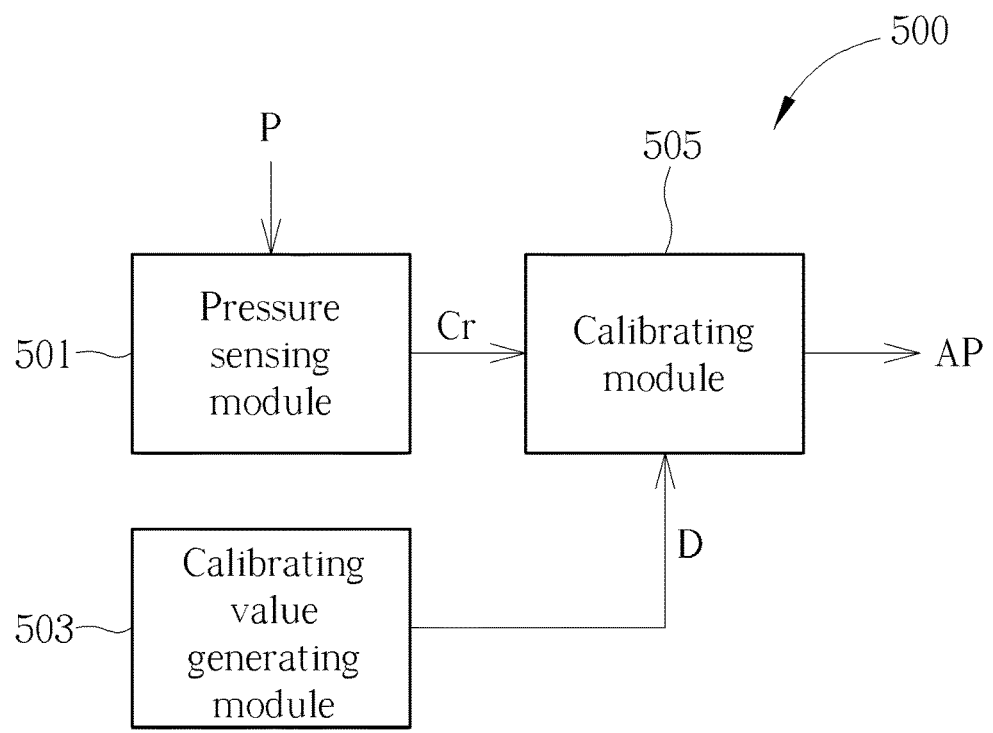
FIG. 5 is a block diagram illustrating a pressure measuring apparatus according to another embodiment of the present invention.

FIG. 5 is a block diagram illustrating a pressure measuring apparatus according to another embodiment of the present invention. As illustrated in FIG. 5, the pressure measuring apparatus 500 comprises a pressure sensing module 501, a calibrating value generating module 503 and a calibrating module 505. Please note each component can be integrated, or be separated to more components. The pressure sensing module 501 generates an actual pressure sensing value Cr according to a pressure P. In one embodiment, the actual pressure sensing value Cr is an actual pressure sensing value which is not calibrated. The calibrating value generating module 503 is configured to generate calibrating values D for different scan frequencies. In one embodiment, the calibrating value D is a pressure sensing value while the pressure is 0. Therefore, the calibrating value D can be regarded as a compensate value for an error for a pressure sensing value, which is caused by different scan frequencies. The calibrating module 505 selects the calibrating value D according to the scan frequency, and generates a calibrated pressure sensing value CC according to the actual pressure sensing value Cr and the calibrating value D. In one embodiment, the following Equation (1) is applied to compute the calibrated pressure sensing value CC.

$$CC(x,y)=Cr(x,y)-D(x,0) \qquad \text{Equation (1)}$$

x means the scan frequency, and y means a pressure sensed by the pressure sensing module 501. That is, the actual pressure sensing value Cr is determined by the scan frequency and the pressure sensed by the pressure sensing module 501. A look up table can be acquired according to a plurality of test results, and relations between scan frequencies and calibrating values D can be accordingly acquired. Therefore, the calibrating module 505 can acquire a suitable calibrating value D according to the scan frequency.

Please note the minus sign in the equation (1) can be replaced by another operation sign such as a plus sign, depending on how the calibrating value D is defined. Besides, the equation (1) is only an example for explaining, other equations which can calibrate the actual pressure sensing value by a calibrating value should also fall in the scope of the present application. Also, after the calibrated pressure is acquired, the calibrating module 505 can correspondingly computes the calibrated pressure AP.

The calibrating value generating module 503 can be implemented by various kinds of circuits. For example, the calibrating value generating module 503 can be a simplified pressure sensor, which means a circuit comprises at least one capacitor and at least one resistor. The calibrating module 505 can be a circuit with logic operation ability, such as a microprocessor, and can be a circuit comprises at least one logic gate.

Figure 6:
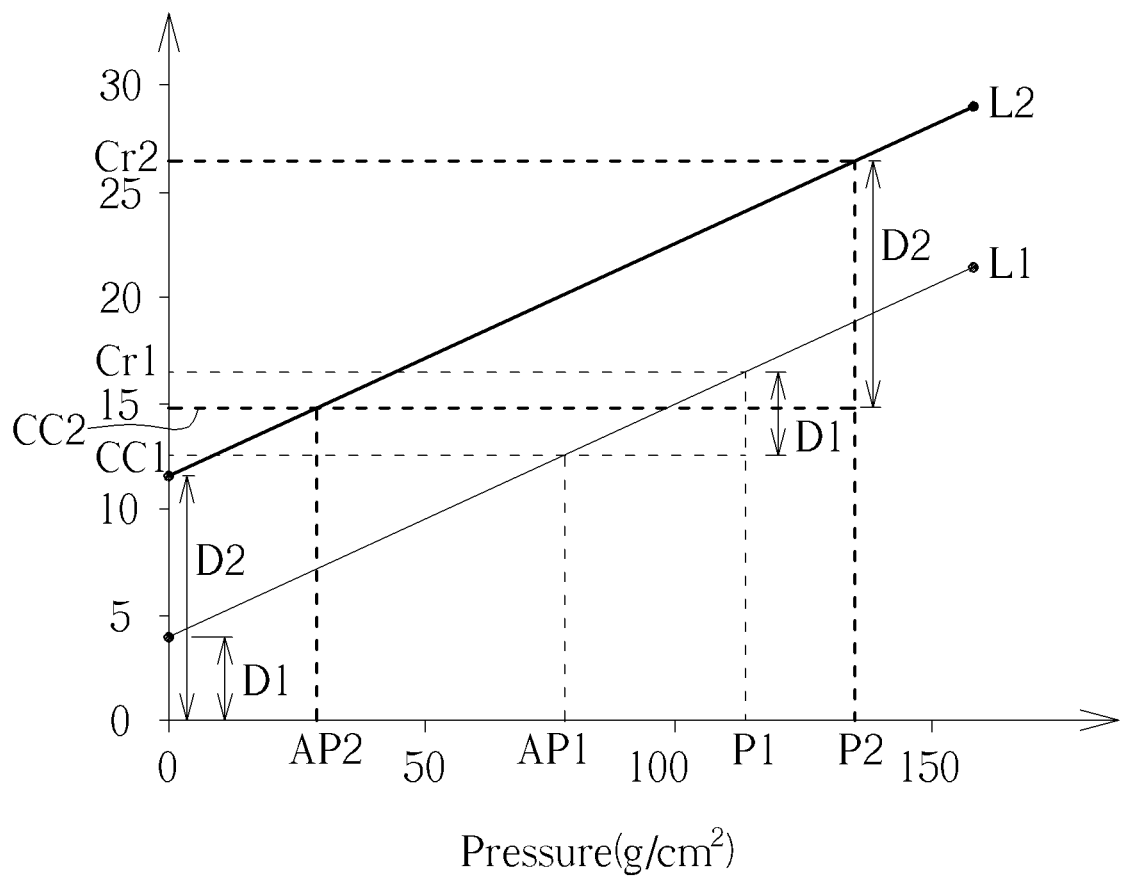
FIG. 6 is a schematic diagram illustrating how to computing a calibrating value according to one embodiment of the present invention.

FIG. 6 is a schematic diagram illustrating how to computing a calibrating value according to one embodiment of the present invention. As illustrated in FIG. 6, the pressure sensing module 501 generates pressure sensing values according to pressures via pressure/sensing value relation lines L1, L2. Please note, in this example the pressure/sensing value relation lines L1, L2 are straight lines with the same slope, but the pressure/sensing value relation line L1 operates at a first scan frequency, the pressure/sensing value relation line L2 operates at a second scan frequency. Besides, the pressure/sensing value relation lines L1, L2 have a linear relationship with a pressure. However, the pressure/sensing value relation line applied by the pressure sensing module 501 is not limited to the straight line illustrated in FIG. 6. Also, the pressure sensing module 501 can apply different pressure/sensing value relation lines for different scan frequencies. That is, any method applying different calibrating values corresponding to different scan frequencies to calibrate pressure sensing values to accordingly generate calibrated pressures should fall in the scope of the present invention.

Ideally, the pressure sensing value is 0 while the pressure is 0. However, as illustrated in FIG. 6, for the pressure/sensing value relation line L1, the pressure sensing value is not 0 while the pressure is 0. Therefore, the calibrating value generating module 503 can accordingly compute the first calibrating value D1. Thus, an incorrect first pressure P1 is acquired if the pressure sensing module 501 senses the first actual pressure sensing value Cr1 but does not calibrate it. Accordingly, the calibrating module 505 minus the first calibrating value D1 from the first actual pressure sensing value Cr1 to acquire the first calibrated pressure sensing value CC1, and then computes the first calibrated pressure AP1 according to the first calibrated pressure sensing value CC1.

The calibrating values are different for different scan frequencies. Take FIG. 6 for example, the calibrating value becomes D2 for the second scan frequency. Also, an incorrect second pressure P2 is acquired if the pressure sensing module 501 senses the second actual pressure sensing value Cr2 but does not calibrate it. Accordingly, the calibrating module 505 minus the second calibrating value D2 from the second actual pressure sensing value Cr2 to acquire the second calibrated pressure sensing value CC2, and then computes the second calibrated pressure AP1 according to the second calibrated pressure sensing value CC2.

Please note, in the embodiment of FIG. 6, different pressure/sensing value relation lines are provided for different scan frequencies (i.e. different predetermined functions). However, in one embodiment, the same pressure/sensing value relation line (i.e. the same predetermined functions) is provided for different scan frequencies, and only the calibrating values are changed.

In one embodiment, the operations for computing calibrating values illustrated in FIG. 5 and FIG. 6, can be performed in a test mode, to acquire calibrating values for part or all scan frequencies and then record the calibrating values. The operation for calibrating pressure sensing values according to the calibrating values can be performed in a normal mode, but not limited.

Figure 7:
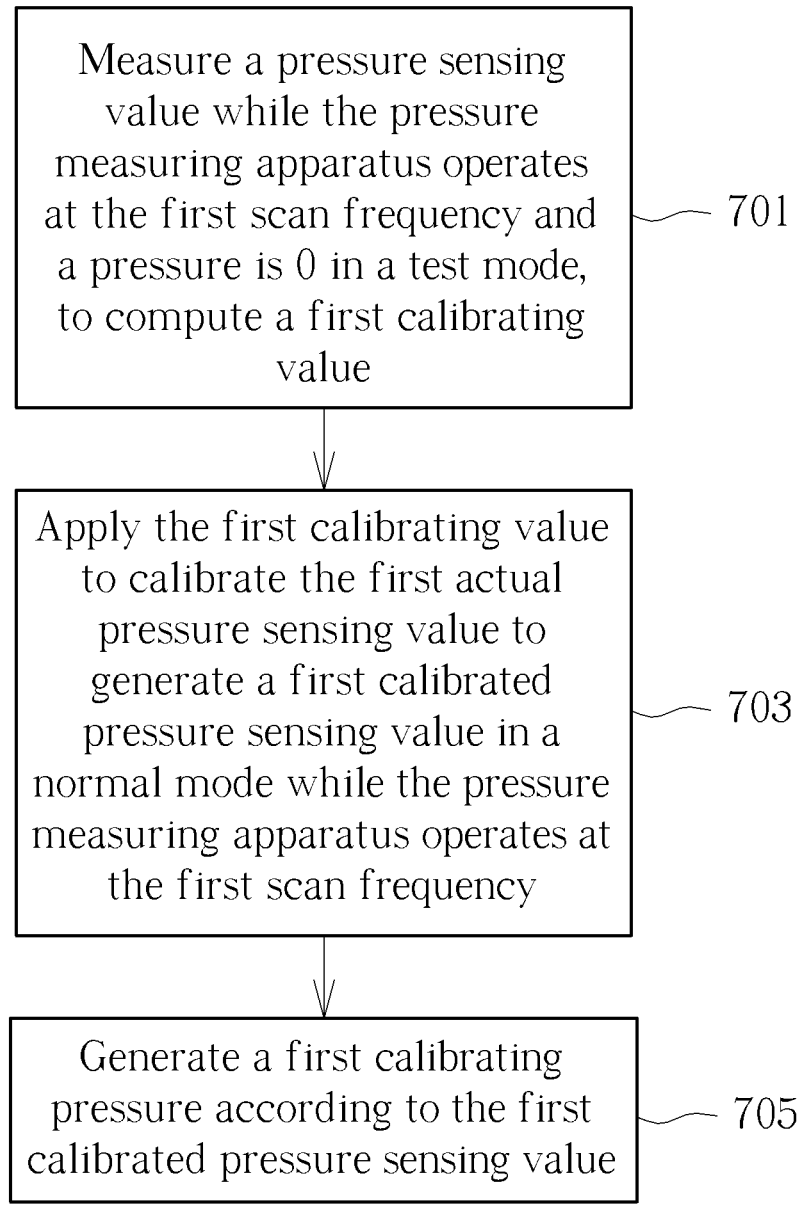
FIG. 7 is a flow chart illustrating a pressure measuring method according to another embodiment of the present invention.

In view of above-mentioned embodiments, the pressure measuring method illustrated in FIG. 7 can be acquired, which comprises following steps:

Step 701

Measure a pressure sensing value while the pressure measuring apparatus operates at the first scan frequency and a pressure is 0 in a test mode, to compute a first calibrating value (ex. D1 in FIG. 6).

Step 703

Apply the first calibrating value to calibrate the first actual pressure sensing value (ex. Cr1 in FIG. 6) to generate a first calibrated pressure sensing value (ex. CC1 in FIG. 6) in a normal mode while the pressure measuring apparatus operates at the first scan frequency.

Step 705

Generate a first calibrating pressure (ex. AP1 in FIG. 6) according to the first calibrated pressure sensing value.

As above-mentioned, the pressure measuring method provided by the present invention can be applied to measure calibrating values for different scan frequencies (ex. the second calibrating value D2 in FIG. 6). Also, a calibrating value is selected according the current scan frequency.

The embodiments in FIG. 5 to FIG. 7 can reduce a number for the recorded pressure/sensing value relation lines via recording the calibrating values. Accordingly, the storage space and a number for the computing steps can be decreased.

In view of above embodiments, the pressure sensing value can be calibrated, to solve the issue that the pressure sensing values are affected by scan frequencies for prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pressure measuring method, applied to a pressure measuring apparatus, comprising:
   measuring a first pressure sensing value of the pressure measuring apparatus, which corresponds to a first pressure in a test mode;
   measuring a second pressure sensing value of the pressure measuring apparatus, which corresponds to a second pressure in the test mode;
   sensing a third pressure sensing value via the pressure measuring apparatus in a normal mode; and generating a third pressure according to the third pressure sensing value, the first pressure, the second pressure, the first pressure sensing value and the second pressure sensing value;

wherein the pressure measuring apparatus operates at a first scan frequency;

wherein the pressure measuring apparatus generates different pressure sensing values if receives an identical pressure and operates at different scan frequencies.

2. The pressure measuring method of claim 1, wherein the pressure measuring apparatus is a capacitive pressure measuring apparatus, wherein the first pressure sensing value, the second pressure sensing value, and the third pressure sensing value are capacitance values.

3. The pressure measuring method of claim 1, further comprising:

controlling the pressure measuring apparatus to operate at a second scan frequency;

measuring a fourth pressure sensing value of the pressure measuring apparatus, which corresponds to a fourth pressure, in the test mode while the pressure measuring apparatus operates at the second scan frequency;

measuring a fifth pressure sensing value of the pressure measuring apparatus, which corresponds to a fifth pressure, in the test mode while the pressure measuring apparatus operates at the second scan frequency;

generating a second corresponding function according to the fourth pressure sensing value and the fifth pressure sensing value;

sensing a sixth pressure sensing value via the pressure measuring apparatus in the normal mode, while the pressure measuring apparatus operates at the second scan frequency; and generating a sixth pressure according to the sixth pressure sensing value via the second corresponding function.

4. The pressure measuring method of claim 3, wherein the pressure measuring apparatus is a capacitive pressure measuring apparatus, wherein the fourth pressure sensing value, the fifth pressure sensing value, and the sixth pressure sensing value are capacitance values.

5. The pressure measuring method of claim 1, further comprising:

generating a first corresponding function according to the first pressure, the second pressure, the first pressure sensing value and the second pressure sensing value;

wherein the step of generating the third pressure generates the third pressure according to the third pressure sensing value via the first corresponding function.

* * * * *